United States Patent [19]

Guslits et al.

[11] Patent Number: 4,830,165

[45] Date of Patent: May 16, 1989

[54] DRIVE MECHANISM FOR A REPRODUCTION APPARATUS

[75] Inventors: Vladimir S. Guslits; Steven P. Bailey, both of Rochester, N.Y.

[73] Assignee: Eastman Kodak Company, Rochester, N.Y.

[21] Appl. No.: 128,312

[22] Filed: Dec. 3, 1987

[51] Int. Cl.[4] .......................... F16H 7/14; F16D 41/00

[52] U.S. Cl. ............................. 192/110 R; 192/41 R; 192/115; 74/397; 474/114

[58] Field of Search ................. 192/110 R, 115, 41 R; 74/397; 474/77, 78, 113, 114; 403/13, 14; 242/199, 200

[56] References Cited

U.S. PATENT DOCUMENTS 3,484,056 12/1969 Sugino et al. ....................... 242/200
3,815,380 6/1974 Esmay ................................ 464/173
4,128,079 12/1978 Suzuki ................................ 118/658
4,449,809 5/1984 Tamura ........................... 355/3 DR
4,548,491 10/1985 Eiland ................................ 355/3 R
4,607,734 8/1986 Watashi et al. ................... 192/67 R
4,615,605 10/1986 Kida ................................... 355/3 R
4,681,280 7/1987 Duurland ........................... 242/199

FOREIGN PATENT DOCUMENTS 54-148959 11/1979 Japan .................................... 403/13

*Primary Examiner*—Rodney H. Bonck
*Assistant Examiner*—David Testardi
*Attorney, Agent, or Firm*—Tallam N. Nguti

[57] ABSTRACT

A drive mechanism rotates a shaft of a station of a reproduction apparatus about an axis. The station is movable in the reproduction apparatus in a direction substantially parallel to the axis to engage the shaft with the drive mechanism and disengage the shaft from the drive mechanism. As the shaft is moved into engagement with the drive mechanism, the mechanism can move with respect to the axis so that the drive mechanism is adjusted to receive the shaft.

2 Claims, 3 Drawing Sheets

DRIVE MECHANISM FOR A REPRODUCTION APPARATUS

BACKGROUND OF THE INVENTION

The present invention relates to a mechanism for driving a shaft of a station of a reproduction apparatus and, more specifically, for driving a shaft of a development station of an electrographic copier/duplicator or printer.

It is known to bolt a drive mechanism for a shaft of a development station to a mechanism plate near the rear of a copier/duplicator. Power is applied to the station from the back side of the mechanism plate through a gear or sprocket. The development station is located at the front side of the mechanism plate, and it moves on guides into and out of engagement with the drive mechanism. As the development station is moved into the copier from the front side of the plate the shaft on the station passes through an opening in the plate and enters a clutch of the drive mechanism. Guides mount the station in the apparatus so that the station moves in a direction substantially parallel to the axis of the shaft to engage the shaft with the drive mechanism and disengage the shaft from the drive mechanism.

The shaft on the station may not be exactly aligned with the clutch of the drive mechanism. Therefore, the bolts that mount the drive mechanism on the plate are positioned in vertically elongated slots in a flange on the clutch. By removing the back of the copier, these bolts can be loosened to permit vertical adjustment only of the clutch in order to improve the alignment of the shaft and the clutch. This vertical adjustment can be in two parallel directions (i.e., up and down) within limits determined by the length of the slots. However, there is no horizontal adjustment or skew adjustment, so when the bolts are re-tightened, the shaft may not be aligned precisely with the clutch. The resulting misalignment adversely affects the drive to the development station and may cause the shaft to bind in the clutch. The mechanism is also difficult to install in view of the requirement to attach nuts to the mounting bolts from the back of the copier.

SUMMARY OF THE INVENTION

It is an object of the invention to provide a drive mechanism for a shaft of a station of a reproduction apparatus which accommodates misalignment between the drive mechanism and the shaft. The present invention relates to an improved drive mechanism for rotating a shaft of a station of a reproduction apparatus about an axis. The mechanism is supported by a fixed plate in the reproduction apparatus, and the station is movable in the reproduction apparatus in a direction substantially parallel to the axis to engage the shaft with the drive mechanism and disengage the shaft from the drive mechanism. The mechanism of the invention has a shaft receiving means with an elongate opening for receiving the shaft. Means are provided for mounting the receiving means on the plate with the opening generally aligned with the axis of the shaft as the shaft is moved toward engagement with the drive mechanism. The receiving means is movable radially in at least two non-parallel directions with respect to the axis during engagement of the shaft with the receiving means so that the drive mechanism is adjusted to the axis of the shaft as the shaft is engaged with the drive mechanism.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
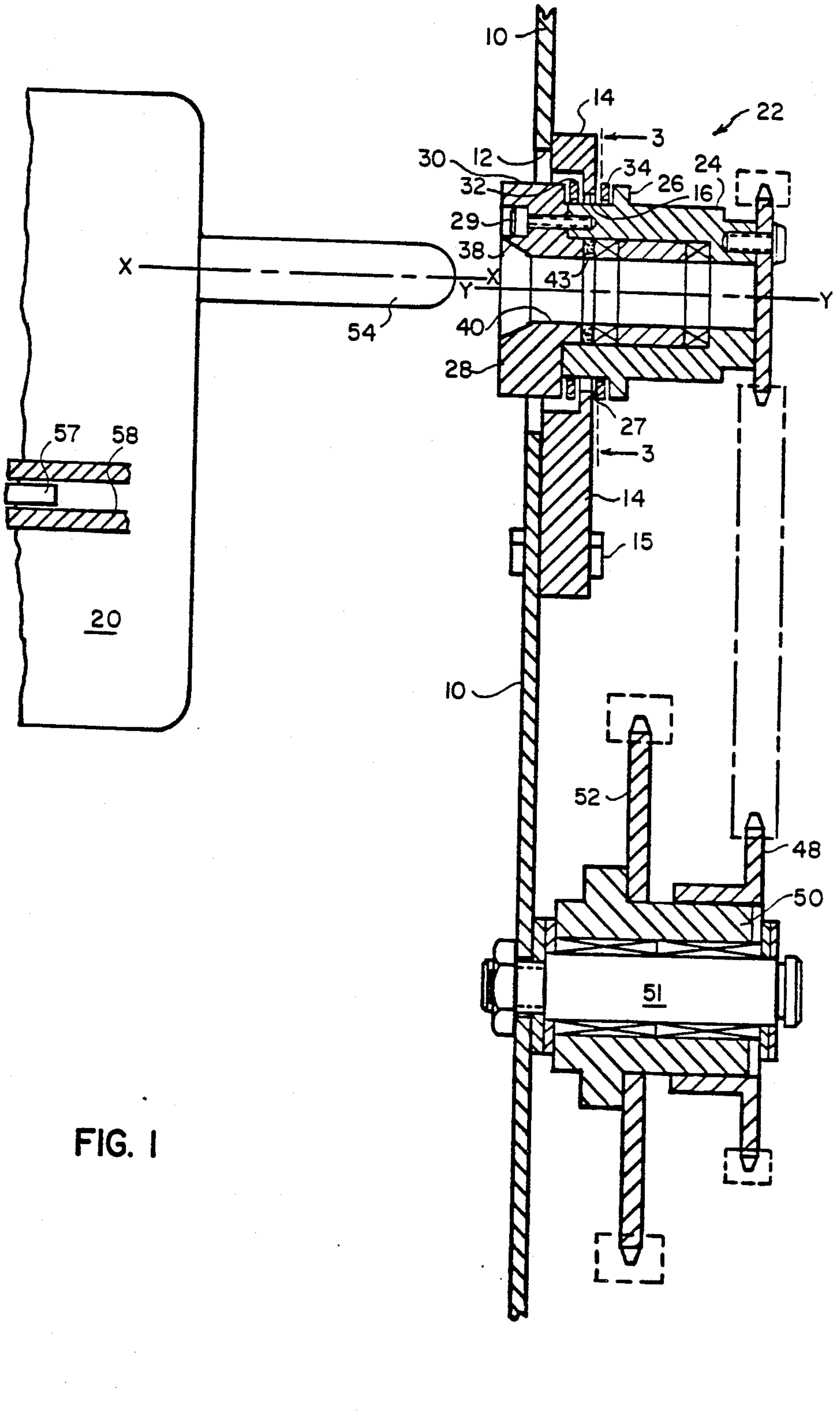
FIG. 1 is a view, partially in section and partially in elevation, showing a station of a reproduction apparatus as it approaches a drive mechanism for the station.

Referring now to the drawings, a fixed mechanism plate 10 is located near the back of a copier/duplicator, a printer or other reproduction apparatus. The plate has an opening 12 therein, and a mounting member 14 is secured to the mechanism plate by one or more bolts 15. As explained in more detail later, a circular opening 16 in the mounting member is substantially aligned with the axis of the driven shaft of a station of a reproduction apparatus, such as a development station 20.

Figure 3:
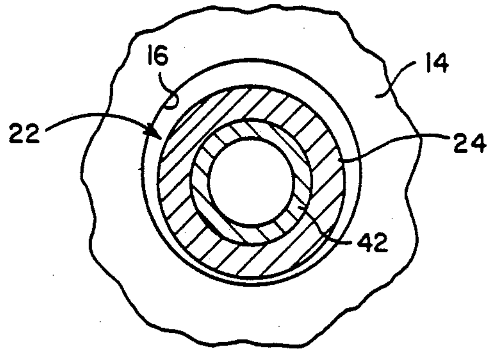
FIG. 3 is a fragmentary section taken along line 3—3 of FiG. 1.
Figure 4:
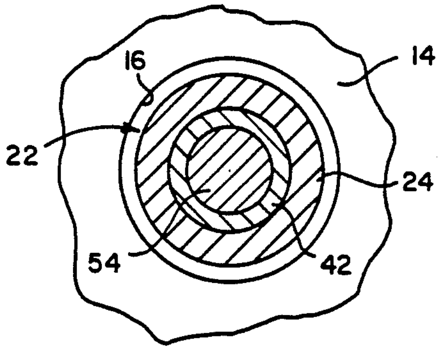
FIG. 4 is a view similar to FIG. 3 but showing the parts in the positions illustrated in FIG. 2.

The drive mechanism for development station 20 is generally designated 22 and includes a housing 24 having an annular flange 26. The left end of housing 24 has a cylindrical portion 27 that fits loosely within the opening 16 of the mounting member. The flange 26 is larger in diameter than the opening 16. When the housing is positioned within the mounting member 14, an end cap 28 is secured to the left end of the housing by bolts 29. The end cap also has a flange 30 that is larger in diameter than the opening 16 of the mounting member 14. A pair of annular washers 32, 34 are located between flanges 30 and 26 and the mounting member 14. Movement between rotatable members 24, 28 and stationary mounting member 14 is facilitated by the washers 32, 34. Opening 16 in the mounting member is larger in diameter than the cylindrical portion of housing 24 that is immediately radially inwardly thereof so that the housing is free to move slightly (i.e. to the extent necessary to align the axis of the drive mechanism 22 to the axis of the shaft, and to the extent limited, as shown in FIGS. 3 and 4, by the relatively larger diametrical dimension of the opening 16) in any radial direction relative to the mounting member 14.

The left end of end cap 28 has a conical surface 38 that leads to a cylindrical opening 40 in the end cap. A one-way clutch 42 is positioned within the housing 24 adjacent end cap 28. Preferably, the clutch has an inner diameter that is just slightly smaller than the diameter of the cylindrical opening 40 in the end cap. A wiper 43 is positioned between the clutch and the end cap. Surface 38, opening 40 and clutch 42 are coaxial with each other. The axis of these parts and drive mechanism 22 is designated Y—Y.

A sprocket 44 is secured to the right end of the housing 24 by bolts 45. The sprocket is driven by a chain 46 trained around sprocket 44 and a sprocket 48. Sprocket 48, in turn, is mounted on a hub 50 that is driven from another sprocket 52 on the hub. Sprocket 52 is connected to a drive (not shown). Hub 50 rotates on a shaft 51 that is secured to the mechanism plate 10.

Figure 2:
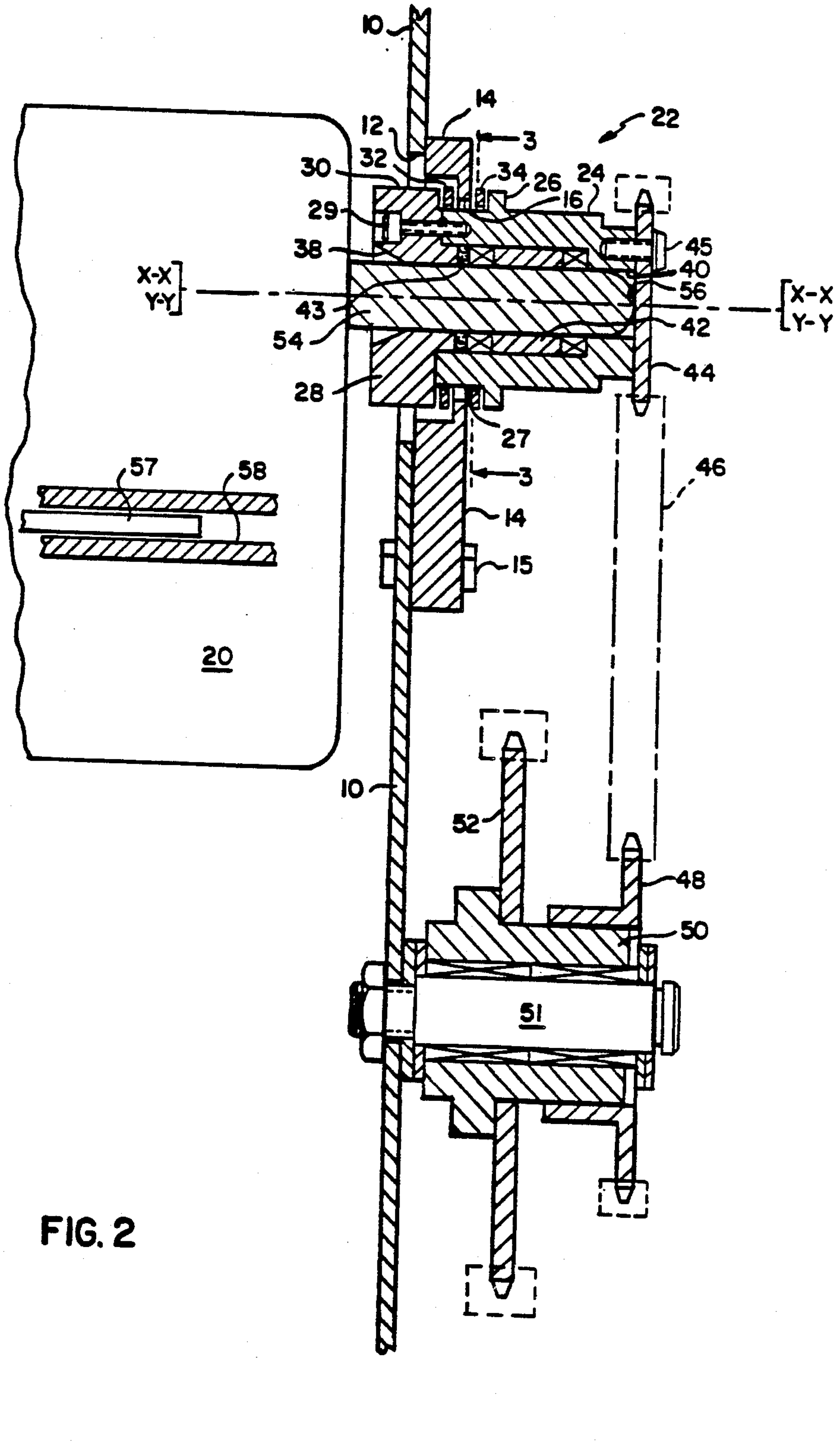
FIG. 2 is a view similar to FIG. 1 but showing the shaft of the station engaged with the drive mechanism.

The development station 20 has an input shaft 54 that projects from the inner end of the station and is rotatable about its axis X—X. The outermost end of the shaft is spherical in shape as shown at 56. The station 20 is movable in directions parallel to axis X—X to engage the shaft 54 with drive mechanism 22 as shown in FIGS. 2 and 4 and to disengage the shaft from the drive mechanism as shown in FIGS. 1 and 3.

The station is guided for movement relative to the drive mechanism by a suitable guide mechanism. For example, the guide mechanism may comprise guide rails 57 on the station that ride in stationary guide slots 58 of the reproduction apparatus. While only one rail 57 and slot 58 are shown in the drawings, it will be understood that similar guide rails and slots are provided on two sides of station 20. The guide mechanism should locate axis X—X of shaft 54 approximately in line with axis Y—Y of drive mechanism 22 as shown in FIG. 1. Thus as the station 20 is moved into the copier in a left-to-right direction as viewed in FIGS. 1 and 2, the end 56 of shaft 54 is approximately aligned with the axis Y—Y of the clutch 42. If the axis X—X of shaft 54 is misaligned with axis Y—Y as shown in FIGS. 1 and 3, the spherical end 56 of shaft 54 initially engages conical surface 38 of end cap 28 to deflect the drive mechanism relative to mounting member 14. Then the shaft enters the cylindrical opening 40 of the end cap and the clutch 42 to the position shown in FIGS. 2 and 4 where axes X—X and Y—Y are coincident.

Housing 24, end cap 28 and the clutch 42 are free to move perpendicular to axes X—X and Y—Y to some extent (i.e. to the extent necessary to align the axis Y—Y to the axis X—X, and to the extent limited, as shown in FIGS. 3 and 4, by the relatively larger diametrical dimension of the opening 16) due to the loose fit between the mounting member 14 and housing 24. As best shown in FIGS. 3 and 4, the drive mechanism is free to move radially in any direction relative to the axes with such movement being limited by the relative dimensions of opening 16 in mounting member 14 and the diameter of housing 24 in the opening. This adjustment of the drive mechanism occurs automatically upon insertion of shaft 54 and without the need to manually reposition the drive mechanism on the plate 10.

Similarly, the loose fit between the washers 32, 34, housing 24 and the end cap 28 allows some axial movement of the drive mechanism relative to the mounting member 14. Some skew or angular misalignment of axes X—X and Y—Y also can be corrected by the loose fit of the drive mechanism in mounting member 14. Thus in response to moving the shaft 54 into the mounting mechanism, the drive mechanism accommodates itself to the shaft 54 of station 20 radially, axially and angularly.

As sprocket 44 is driven the one-way clutch firmly engages the outer surface of the shaft 54 to drive the shaft and thus apply the required torque for operation of the station 20. The one-way clutch 42 tends to grip the shaft 54. In order to release the clutch from the shaft when the station 20 is to be withdrawn from the copier, shaft 54 can be turned in the opposite direction to release the clutch from the shaft.

The mechanism described above greatly simplifies installation of the development station into a reproduction apparatus and eliminates the need to remove the rear housing of the apparatus and manually adjust the drive mechanism as explained previously. In addition, the drive mechanism automatically accommodates itself to the position of the shaft 54 to correct radial and axial misalignment and skewing of the drive mechanism and shaft 54.

In some instances it may be desirable to eliminate mounting member 14 and assemble the drive mechanism directly on plate 10 of the reproduction apparatus. However, it generally is preferable for drive mechanism 22 and mounting member 14 to first be assembled together, and then to mount this sub-assembly on plate 10 by bolts 15 during final assembly of the reproduction apparatus.

A conventional chain tensioning device (not shown) can be provided to keep chain 46 tight while the drive mechanism moves within mounting member 14. Such a tensioning device can comprise a roller or sprocket that is biased against the portion of the chain between sprockets 44 and 48.

The invention has been described in detail with particular reference to a preferred embodiment thereof, but it will be understood that variations and modifications can be effected within the spirit and scope of the invention as described hereinabove and as defined in the appended claims.

We claim:

1. A drive mechanism for rotating a shaft of a station of a reproduction apparatus about an axis, the station being movable in the reproduction apparatus in a direction substantially parallel to the axis to engage the shaft with the drive mechanism and disengage the shaft from the drive mechanism, the mechanism comprising:

a stationary member in the reproduction apparatus having a circular opening with a center located generally at the axis of the shaft;

a housing having a generally cylindrical portion that fits loosely within the opening of the member so that the cylindrical portion can move radially within the opening, the housing having a flange projecting from the cylindrical portion and positioned adjacent one side of the member;

an end cap secured to the cylindrical portion of the housing and having a flange positioned adjacent a second side of the member, the flange of the end cap and the flange of the housing being spaced apart by a distance greater than the thickness of the member so that the housing and end cap can move relative to the member, the end cap having a cylindrical opening therein through which the shaft passes as the shaft is engaged with and disengaged from the drive mechanism;

a clutch positioned within the cylindrical portion of the housing and supported by the housing, the clutch receiving the shaft when it is engaged with the drive mechanism; and means for rotating the clutch so that the shaft can be rotated about its axis when the shaft is engaged with the clutch.

2. A drive mechanism for rotating a shaft of a station of a reproduction apparatus about an axis, the mechanism being supported by a fixed plate in the reproduction apparatus, the station being movable in the reproduction apparatus in a direction substantially parallel to the axis to engage the shaft with the drive mechanism and disengage the shaft from the drive mechanism, the mechanism comprising:

a mounting member secured to the plate in the reproduction apparatus, the mounting member having a circular opening with a center located substantially at the axis of the shaft;

a housing having a generally cylindrical portion that fits loosely within the opening of the mounting member so that the cylindrical portion can move radially within the opening of the mounting member, the housing having a flange projecting from the cylindrical portion and positioned adjacent one side of the mounting member;

an end cap secured to the cylindrical portion of the housing and having a flange positioned adjacent a second side of the mounting member, the flange of the end cap and the flange of the housing being spaced apart by a distance greater than the thickness of the mounting member so that the housing and end cap can move relative to the mounting member, the end cap having a cylindrical opening therein through which the shaft passes as the shaft is engaged with and disengaged from the drive mechanism;

a clutch positioned within the cylindrical portion of the housing and supported by the housing, the clutch receiving the shaft when it is engaged with the drive mechanism; and means for rotating the housing about the axis of its cylindrical portion to thereby rotate the end cap and clutch so that the shaft can be rotated about its axis when the shaft is engaged with the drive mechanism.

* * * * *